United States Patent Office 2,756,179
Patented July 24, 1956

2,756,179

PRODUCTION OF $\Delta^1$ BONDS IN THE A RING OF THE CYCLOPENTANOPOLYHYDROPHENANTHRENE NUCLEUS BY STREPTOMYCES LAVENDULAE

Josef Fried and Richard W. Thoma, New Brunswick, N. J., assignors to Olin Mathieson Chemical Corporation, New York, N. Y., a corporation of Virginia No Drawing. Application April 20, 1953,
Serial No. 349,975

1 Claim. (Cl. 195—51)

This invention relates to, and has for an object the provision of, certain oxidized steroids, and microbiological methods for the production of oxidized steroids.

More particularly, it is the object of this invention to provide a fermentation process for oxidizing 3-oxy(or oxo)$C_{17}$-substituted steroids involving the use of *Streptomyces lavendulae* (or enzymes thereof); and to provide oxidized steroids useful as intermediates for the synthesis of certain hormones, notably estradiol and estrone.

In the practice of this invention, the oxidation may be effected in a growing culture of *Streptomyces lavendulae* by either adding the steroid (or mixture of steroids) to the culture during the incubation period, or by including it in the nutrient medium prior to inoculation. In any case, assimilable sources of nitrogenous materials (for growth-promotion) and carbon-containing materials (as energy source) should be present in the culture medium. Also, an adequate, sterile air supply should be maintained during the oxidation, e. g., by the conventional techniques of (1) exposing a large surface of the medium to air, or (2) submerged culture.

Alternatively, the oxidation may be effected by subjecting the steroid to the action of enzymes of *Streptomyces lavendulae* (i. e., by bringing together, in an aqueous medium, the steroid, oxygen and nonproliferating cells of the microorganism).

As the steroid, any cyclopentanophenanthrene (or hydrogenated cyclopentanophenanthrene) containing an oxy or oxo group in the 3-position and having a substituent (especially an oxy- and/or oxo-containing substituent) at $C_{17}$ may be used. [The term oxy, as used herein, includes both free hydroxy and etherified or esterified hydroxy, e. g., alkoxy or carboalkoxy.] These steroids include the pregnenes, pregnanes, androstenes and androstanes, the pregnenes being preferred. Thus, among the steroids utilizable in the process of the invention are: progesterone; testosterone; Reichstein's Compound "S" (11-desoxy-17-hydrocorticosterone); estriol; estradiol; testosterone fatty acid esters (e. g., acetate, propionate, enanthate); Reichstein's Compound "S" fatty acid esters (e. g., acetate, propionate, butyrate, etc.); 11α-hydroxy-Reichstein's Compound "S"; 17-hydroxy-11-dehydrocorticosterone; 17-hydroxycorticosterone; $\Delta^4$-androstenedione-3,17; the 3,20-preganediols and allopregnanediols; pregnanedione; 11-dehydroprogesterone; desoxycorticosterone; hydroxyprogesterones, such as the 11α, 11β or 16α hydroxy progesterones; ketoprogesterones, such as the 11, 12 or 6 keto progesterones; and $\Delta^4$-3-keto etiocholanic acid. Also utilizable are the known dehydro [the term "dehydro" having the accepted meaning "dehydrogenated" and not "dehydrated"] derivatives of the above-mentioned steroids (e. g., those having a C=C linkage in the following positions: 6,7; 8,9; 9,11; 11,12; 8,14; or 14,15).

The sources of nitrogenous, growth-promoting factors may be natural organics (e. g., soybean meal, cornsteep liquor, meat extract and/or distillers solubles) or synthetics such as nitrates and ammonium compounds.

As to the energy-source material, lipids, especially (1) fat acids having at least 14 carbon atoms, (2) fats or (3) mixtures thereof, are preferred. Examples of such fats are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin; and illustrative fat acids are stearic, palmitic, oleic, linoleic and myristic acids. However, other carbon-containing materials may also be used. Examples of such materials are glycerol, glucose, fructose, sucrose, lactose, maltose, dextrins, starches and whey. These materials may be used either in purified state or as concentrates, such as whey concentrate, cornsteep liquor, or grain mashes (e. g., corn, wheat or barley mash). Mixtures of the above may, of course, be employed. It is to be noted, however, that the steroid is added to the fermentation medium essentially as a precursor, and not as an energy source.

The media used in the process of the invention may contain other precursors in addition to the steroids to obtain other valuable products. For example, an assimilable source of cobalt may be included where a vitamin $B_{12}$ is desired, and the by-product then recovered by conventional methods.

The process of the invention may result in various oxidation products. Thus, progesterone is oxidized in the $C_{17}$ position to yield $\Delta^1$-testosterone and $\Delta^{1,4}$-androstadiendione-3,17, which are convertible to estradiol and estrone, respectively.

The following examples are illustrative of the invention but are not to be construed as a limitation thereof.

EXAMPLE 1

*Oxidation of progesterone*

(a) *Fermentation.*—A medium of the following composition is prepared: soybean meal, 15.0 g.; glucose, 10.0 g.; soybean oil, 2.2 g.; progesterone, 0.5 g.; and distilled water to make 1 liter. The medium is adjusted to pH 7.0 ± 0.1. Then, 100 ml. portions of the medium are distributed in 500 ml. Erlenmayer flasks, and the flasks plugged with cotton and sterilized in the usual manner (i. e., by autoclaving for 30 minutes at 120° C.). When cool, each of the flasks is inoculated with 5–10% of a vegetative inoculum of *Streptomyces lavendulae* WC 3440–14 (available in the Waksman Collection of the Institute of Microbiology, Rutgers University, New Brunswick, New Jersey under the catalogue number 3440–14). [the vegetative inoculum being grown from stock cultures (lyophilized vial or agar slant) for 48–72 hours (with or without transfer and additional incubation for 24–48 hours) in a medium of the following composition: Soybean meal, 15.0 g.; sodium chloride, 5.0 g.; cerelose, 21.6 g.; distilled water to make 1 liter]. The flasks are then placed on a reciprocating shaker and mechanically shaken at 25° C. for 3 days. The contents of the flasks are then pooled and, after the pH of the culture is adjusted to about 4 ± 0.2 with sulfuric acid, filtered (using Seitz filter pads or other suitable filtering media) to separate the mycelium from the fermented medium.

(b) *Isolation of products from the culture filtrate.*—1730 ml. of the culture filtrate obtained as described in (a) is extracted four times with one liter portions of chloroform, then the chloroform extracts are combined and filtered. The resulting chloroform solution is evaporated to dryness in vacuo and the residue (359 mg.) is taken up in 15 ml. aqueous methanol (80%). The methanol solution is extracted four times with 15 ml. portions of hexane, then concentrated in vacuo until all the methanol has evaporated. The residual mixture is extracted three times with 30 ml. portions of chloroform and the chloroform extracts are combined. The combined extracts are dried with sodium sulfate (anhydrous), then evaporated to dryness in vacuo. The residue is dissolved in a mixture of 2 ml. chloroform and 5 ml. benzene, then passed through a column containing 8 g. sulfuric acid-washed alumina. The adsorbed material is eluted with 2:5 chloroform-benzene, the first 25 ml. eluate yielding about 70 mg. of a crystalline fraction (I) which, on fractional crystallization from ether-hexane, yields a small amount of a fraction melting at 199–201° C., but mainly $\Delta^{1,4}$-androstadiendione-3,17 [M. P. 138–139.5° C.; $[\alpha]_D^{24°}+115°$ (c=0.56 in chloroform)]. The latter is identical in physical properties (including IR spectrum) with an authentic sample of $\Delta^{1,4}$-androstadiendione-3,17.

The second 25 ml. eluate yields about 24 ml. of an amorphous fraction (II).

A subsequent 200 ml. eluate yields about 103 mg. crystalline fraction (III), which may be recrystallized from acetone to yield purified $\Delta^{1,4}$-androstadien-17β-ol-3-one ($\Delta^1$-testosterone), having the following characteristics: M. P. 167–168° C.; $[\alpha]_D^{23°}+20.7°$ (c=1.28 in chloroform)

U. V.:$\lambda_{max.}^{alc.}$ 243 m$\mu$ ($\epsilon$=16,100); I. R.:$\lambda_{max.}^{Nujol}$ 2.96$\mu$(OH) and 6.02, 6.18$\mu$($\Delta^{1,4}$-3-ketone)

*Analysis.*—Calculated for $C_{19}H_{26}O_2$: C, 79.66; H, 9.15. Found: C, 79.65; H, 9.10.

(c) *Isolation of products from the mycelium.*—The dried mycelium obtained from fermentation of 2 g. progesterone with *Streptomyces lavendulae* as described in (a) is extracted with 250 ml. acetone by heating in a Soxhlet extractor for 5 hours. The acetone extract is concentrated to 100 ml., chilled in a refrigerator, then filtered. The filtrate is evaporated to dryness in vacuo; and to the residue is added 20 ml. 80% aqueous methanol. This suspension is extracted with eight 20 ml. portions of hexane, and the aqueous methanol solution, which remains, is heated in vacuo to remove the methanol. The resulting aqueous suspension is extracted with chloroform, and the chloroform extract is dried over sodium sulfate, then evaporated to dryness. This residue (about 802 mg.) is dissolved in 10 ml. dry ethyl ether, and the insoluble impurities which separate are removed by centrifugation. The ether solution is then evaporated to dryness in vacuo, and the resulting residue is dissolved in 5 ml. benzene and adsorbed on 15 g. sulfuric acid-washed alumina. Elution with 100 ml. benzene yields about 65 mg. progesterone, M. P. 121–122.5° C. Subsequent elution with 600 ml. benzene yields about 130 mg. solids, which after one recrystallization from ethyl ether melts at about 155–170° C. Further recrystallization of this material from ethyl ether yields pure needles having the following properties: M. P. about 170–171.5° C.; $[\alpha]_D^{20}+81°$ (C, 0.93 in CHCl₃)

$\lambda_{max.}^{alc.}$ 240 m$\mu$ ($\epsilon$=16,000)

*Analysis.*—Calcd. for $C_{21}H_{32}O_2$: C, 79.69; H, 10.14. Found: C, 79.88; H, 10.05.

Oxidation of this substance (M. P. about 170–171.5° C.) with chromic acid in glacial acetic acid yields progesterone (M. P. 124–126°). Infrared and mixed melting point comparison of this substance with authentic samples show that the substance is the β-epimer of $\Delta^4$-pregnene-3-one-20-ol.

(d) *Oxidation of $\Delta^{1,4}$-androstadien-17β-ol-3-one.*—To 20 mg. $\Delta^{1,4}$-androstadien-17β-ol-3-one [obtained as described in (b)] in 2 ml. glacial acetic acid is added 12 mg. chromic acid in 2 ml. glacial acetic acid, and the mixture is allowed to stand for three hours. The excess chromic acid is reduced by addition of 0.5 ml. ethanol, and the solution is then concentrated in vacuo to a small volume. Water and chloroform are then added to the residue, and the chloroform fraction is separated, washed with water, then with dilute aqueous sodium bicarbonate solution and again with water. The resulting chloroform solution is evaporated to dryness in vacuo; and the residue is dissolved in a mixture of 0.5 ml. benzene and 1.5 ml. hexane, and the resulting solution passed through a column containing 350 mg. sulfuric acid-washed alumina. The adsorbed material is eluted with 1:1 benzene-hexane, and the solvents evaporated to isolate the $\Delta^{1,4}$-androstadiendione-3,17 having the following properties: M. P. 138–139° C.; $[\alpha]_D^{23°}+117.5°$ (c=0.41 in chloroform); I. R. substantially the same as that obtained using a known sample of the compound. Analysis: Calculated for $C_{19}H_{24}O_2$: C, 80.24; H, 8.51. Found: C, 80.36; H, 8.22.

The conversion of $\Delta^{1,4}$-androstadien-17β-ol-3-one to estradiol and of $\Delta^{1,4}$-androstadiendione-3,17 to estrone may be effected by thermic treatment as described in U. S. Patent 2,361,847.

EXAMPLE 2

*Oxidation of 16α-hydroxyprogesterone*

(a) *Fermentation.*—Using the process described in Example 1 (a) except that 16α-hydroxyprogesterene is substituted for the progesterone of that example, analagous oxidation products are obtained from both the mycelium and culture filtrate.

(b) The culture filtrate, obtained as described in (a), is taken to dryness by in vacuo distillation to yield about 160 mg. fat-free steroids. These steroids are dissolved in 10 ml. of a 1:9 chloroform-benzene mixture, then adsorbed on 3.2 g. sulfuric acid-washed alumina. Elution with 100 ml. 1:3 chloroform-benzene yields about 20 mg. 16α-hydroxyprogesterone. Subsequent elution with 300 ml. benzene yields about 54 mg. $\Delta^4$-pregnene-16α,20β-diol-3-one having the following properties: M. P. about 212–213° C.; $[\alpha]_D^{23}+44°$ (c=0.97 in chloroform)

$\lambda_{max.}^{alc.}$ 241 m$\mu$ ($\epsilon$=15,200); $\lambda_{max.}^{Nujol}$ 3.01$\mu$(OH)

6.04$\mu$(conj. CO) and 6.21$\mu$(conj. double bond)

*Analysis.*—Calcd. for $C_{21}H_{32}O_3$: C, 75.86; H, 9.70. Found: C, 75.97; H, 9.71.

Further elution of the alumina column with 125 ml. chloroform yields about 24 mg. of $\Delta^{1,4}$-pregnadiene-16α,20β-diol-3-one which, after two recrystallizations from acetone, is found to have the following properties, M. P. about 226.5–227° C.; $[\alpha]_D^{23}-15°$ (c=0.53 in chloroform)

$\lambda_{max.}^{alc.}$ 245 m$\mu$ ($\epsilon_{1\%}^{cm.}$=456); $\lambda_{max.}^{Nujol}$ 3.03$\mu$(OH)

6.04$\mu$(conj. CO), 6.19$\mu$(conj. double bond)

*Analysis.*—Calcd. for $C_{21}H_{30}O_3$: C, 76.32; H, 9.15. Calcd. for $C_{21}H_{32}O_3$: C. 75.86; H, 9.70. Found: C, 76.45; H, 9.75.

Continued elution with 150 ml. 1:1 acetone-chloroform yields about 21 mg. of $\Delta^4$-androstene-16α,17β-diol-3-one having the following properties, M. P. about 182–184°+ $[\alpha]_D^{23}+66°$ (c, 0.54 in CHCl₃)

$\lambda_{max.}^{alc.}$ 241 m$\mu$ ($\epsilon$=15,400); $\lambda_{max.}^{Nujol}$ 2.98$\mu$ 3.08$\mu$(OH)

6.07$\mu$(conj. CO), 6.22$\mu$(conj. double bond)

*Analysis.*—Calcd. for $C_{19}H_{28}O_3$: C, 74.96; H, 9.27. Found: C, 75.22; H, 9.13.

This invention may be variously otherwise embodied within the scope of the appended claim.

We claim:

The process which comprises aerobically growing a culture of *Streptomyces lavendulae* in a nutrient medium, exposing to the action of enzymes produced by said culture a steroid selected from the group consisting of progesterone and 16α-hydroxyprogesterone, and recovering a steroid selected from (a) the group consisting of $\Delta^{1,4}$-androstadienedione - 3,17 and $\Delta^{1,4}$-androstadiene-17β-ol-3-one when progesterone is the steroid and (b) the group consisting of $\Delta^4$-pregnene-16α,20β-diol-3-one, $\Delta^{1,4}$-pregnadiene-16α,20β-diol-3-one and $\Delta^4$-androstene-16α,17β-diol-3-one when 16α-hydroxyprogesterone is the steroid.

(References on following page)

References Cited in the file of this patent

UNITED STATES PATENTS

| | | |
|---|---|---|
| 2,353,808 | Butenandt | July 18, 1944 |
| 2,383,472 | Crooks | Aug. 28, 1945 |
| 2,602,769 | Murray et al. | July 8, 1952 |
| 2,649,401 | Haines | Aug. 18, 1953 |
| 2,658,023 | Shull et al. | Nov. 3, 1953 |
| 2,666,770 | Wall | Jan. 19, 1954 |

FOREIGN PATENTS

| | | |
|---|---|---|
| 4460/51 | Australia | Oct. 18, 1951 |

OTHER REFERENCES

Butenandt: Berichte 72, 417–424 (1939).
Cole et al.: Journal Org. Chem. 19, 131–138 (1954).